United States Patent
Mohara et al.

(10) Patent No.: US 11,016,023 B1
(45) Date of Patent: May 25, 2021

(54) FAR-INFRARED SPECTROSCOPIC DEVICE AND FAR-INFRARED SPECTROSCOPIC METHOD

(71) Applicant: Hitachi High-Technologies Corporation, Tokyo (JP)

(72) Inventors: Mizuki Mohara, Tokyo (JP); Kei Shimura, Tokyo (JP); Kenji Aiko, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 16/638,638

(22) PCT Filed: Aug. 22, 2017

(86) PCT No.: PCT/JP2017/029890
§ 371 (c)(1),
(2) Date: Feb. 12, 2020

(87) PCT Pub. No.: WO2019/038823
PCT Pub. Date: Feb. 28, 2019

(51) Int. Cl.
*G01N 21/3581* (2014.01)
*G01J 3/10* (2006.01)
(Continued)

(52) U.S. Cl.
CPC ........ *G01N 21/3581* (2013.01); *G01J 3/0208* (2013.01); *G01J 3/108* (2013.01); *G01J 3/42* (2013.01); *G01J 2003/421* (2013.01)

(58) Field of Classification Search
CPC .... G01N 21/3581; G01J 3/108; G01J 3/0208; G01J 3/42; G01J 2003/421
See application file for complete search history.

(56) References Cited

U.S. PATENT DOCUMENTS

2002/0024718 A1  2/2002  Kawase et al.
2005/0116170 A1*  6/2005  Kawase ............. G01N 21/3563
                                                    250/341.1
(Continued)

FOREIGN PATENT DOCUMENTS

JP  2002-72269 A  3/2002
JP  2004-317573 A  11/2004
(Continued)

OTHER PUBLICATIONS

Murate et al. ("Low Noise and High Gain Terahertz Parametric Amplifier," 2019 44th International Conference on Infrared, Millimeter, and Terahertz Waves (IRMMW-THz), Paris, France, 2019, pp. 1-3) (Year: 2019).*

(Continued)

*Primary Examiner* — Hina F Ayub
(74) *Attorney, Agent, or Firm* — Crowell & Moring LLP (57) ABSTRACT

In an is-TPG method in which lasers having two different wavelengths are used to generate a wavelength-variable far-infrared light, a far-infrared light (TPG light) having an unstable output at a broad wavelength is also slightly generated at the same time with only one laser light. The generated is-TPG and the TPG light are converted, after passing through a specimen, to near-infrared light inside a nonlinear optical crystal for detection and are observed by a detector. The signal light output of the is-TPG light becomes unstable due to the TPG light. According to the present invention, the TPG light is removed by means of a slit and the like (filter) immediately before the specimen and is not introduced into the nonlinear optical crystal for detection. At this time, by using a change in the emission direction when the frequency of the is TPG light is changed, the filter is moved in accordance with the frequency so that only the is-TPG light passes therethrough (see FIG. 1C).

15 Claims, 9 Drawing Sheets (51) Int. Cl.
  *G01J 3/02* (2006.01)
  *G01J 3/42* (2006.01)

(56) References Cited

U.S. PATENT DOCUMENTS

| | | |
|---|---|---|
| 2006/0268945 A1 | 11/2006 | Minamide et al. |
| 2007/0160093 A1 | 7/2007 | Nishizawa et al. |
| 2008/0298757 A1 | 12/2008 | Dunn et al. |
| 2010/0321767 A1 | 12/2010 | Borguet et al. |
| 2012/0243564 A1 | 9/2012 | Payeur et al. |
| 2012/0280128 A1* | 11/2012 | Shioda ............... G06K 9/00516 250/338.1 |
| 2014/0061474 A1 | 3/2014 | Kitamura |
| 2016/0299064 A1 | 10/2016 | Shimura |
| 2017/0010162 A1 | 1/2017 | Shiramizu |

FOREIGN PATENT DOCUMENTS

| | | |
|---|---|---|
| JP | 2014-62892 A | 4/2014 |
| JP | 2015-148523 A | 8/2015 |
| JP | 2015-152405 A | 8/2015 |
| JP | 2015-203714 A | 11/2015 |
| WO | WO 2005/073795 A1 | 8/2005 |

OTHER PUBLICATIONS

International Search Report (PCT/ISA/210) issued in PCT Application No. PCT/JP2017/029890 dated Nov. 7, 2017 with English translation (four (4) pages).

Japanese-language Written Opinion (PCT/ISA/237) issued in PCT Application No. PCT/JP2017/029890 dated Nov. 7, 2017 (four (4) pages).

"Terahertz Technology Forum", Handbook of Terahertz Technology, Nov. 29, 2007, pp. 426-456, with partial English translation (17 pages).

Shikata., "THz-Wave Parametric Generation and Its Linewidth Control", The transactions of the Institute of Electronics, Information and Communication Engineers, 2002, pp. 52-63, C, J85-C, 2, with partial English translation, (14 pages).

Murate et al., "A High Dynamic Range and Spectrally Flat Terahertz Spectrometer Based on Optical Parametric Processes in $LiNbO_3$", IEEE Transactions on Terahertz Science and Technology, Jul. 2014, pp. 523-526, vol. 4, No. 4, (four (4) pages).

* cited by examiner

FAR-INFRARED SPECTROSCOPIC DEVICE AND FAR-INFRARED SPECTROSCOPIC METHOD

TECHNICAL FIELD

The present disclosure relates to a far-infrared spectroscopic device and afar-infrared spectroscopic method.

BACKGROUND ART

A far-infrared range is also called terahertz wave, in which a substance is transparent and an absorption spectrum specific to the substance is given. It is therefore expected that a substance that less transmits visible light or infrared light or a substance enclosed by a shield can be analyzed by irradiating the substance with far-infrared light to obtain an absorption spectrum (for example, see patent literature 1 and nonpatent literature 1).

For example, a time domain spectroscopy (TDS) method is known as a technique in this field, by which identification of components or quantitative analysis of effective components of pharmaceuticals can be performed. However, the time domain spectroscopy method disadvantageously has a narrow dynamic range of photometry. On the other hand, if peak power of measurement light is strong in an analysis method based on far-infrared spectroscopy, a tablet sample having a thickness of several millimeters may be analyzed. For example, an injection-seeded THz parametric generator (is-TPG) method is known as a photometric method with strong peak power.

CITATION LIST

Patent Literature

Patent Literature 1: Japanese Unexamined Patent Application Publication No. 2015-152405.

Nonpatent Literature

Nonpatent Literature 1: Terahertz Technology Forum (2007) Handbook of Terahertz Technology, pp. 426-456: NGT Ltd., published in Nov. 29, 2007.
Nonpatent Literature 2: Shikata (2002) "THz-Wave Parametric Generation and Its Linewidth Control" The transactions of the Institute of Electronics, Information and Communication Engineers. C, J85-C, 2, pp. 52-63.

SUMMARY OF INVENTION

Technical Problem

Quantitative analysis of an effective component contained in a pharmaceutical is expected in industrial use of a far-infrared spectrometer. An accurate quantitative measurement is required for the quantitative analysis of the effective component contained in the pharmaceutical. To achieve such an accurate quantitative measurement, a signal intensity of detection light produced in a far-infrared spectrometer is important to be stably performed over short and long terms.

The present disclosure, which has been made in light of such a situation, provides a technique to improve stability of detection light intensity in far-infrared spectroscopic analysis.

Solution to Problem

To achieve the above-described object, an example embodiment of the disclosure provides a far-infrared spectroscopic device, which includes a wavelength-variable far-infrared light source generating far-infrared light, an illumination optics that illuminates a specimen with narrowband far-infrared light contained in the far-infrared light output from the wavelength-variable far-infrared light source, a filter that removes broadband far-infrared light generated concurrently with the narrowband far-infrared light, and a photodetection system detecting light transmitted through the specimen.

Further futures associated with the disclosure will be clarified by description of this specification and the accompanying drawings. Some aspects of the present invention are achieved by elements or combinations of various elements according to the following detailed description and modes of the attached claims.

It is necessary to be understood that the description of the specification is merely given by typical example, and does not limit the disclosed claims or application examples in any meaning.

Advantageous Effects of Invention

According to the disclosure, stability of detection light intensity can be improved in far-infrared spectroscopic analysis.

DESCRIPTION OF EMBODIMENTS

Some embodiments of the disclosure relate to a far-infrared spectroscopic device for analysis of a specimen using light in a far-infrared range in quantitative analysis of the component content of a chemical substance in the specimen, in qualitative analysis of the chemical substance, or in an inspection step including foreign matter inspection, and relate to a spectroscopic method using the far-infrared spectroscopic device. Hereinafter, the embodiments are described with reference to drawings.

1. Consideration on Imaging Device Using Light in Far-Infrared Range

Figure 1A:
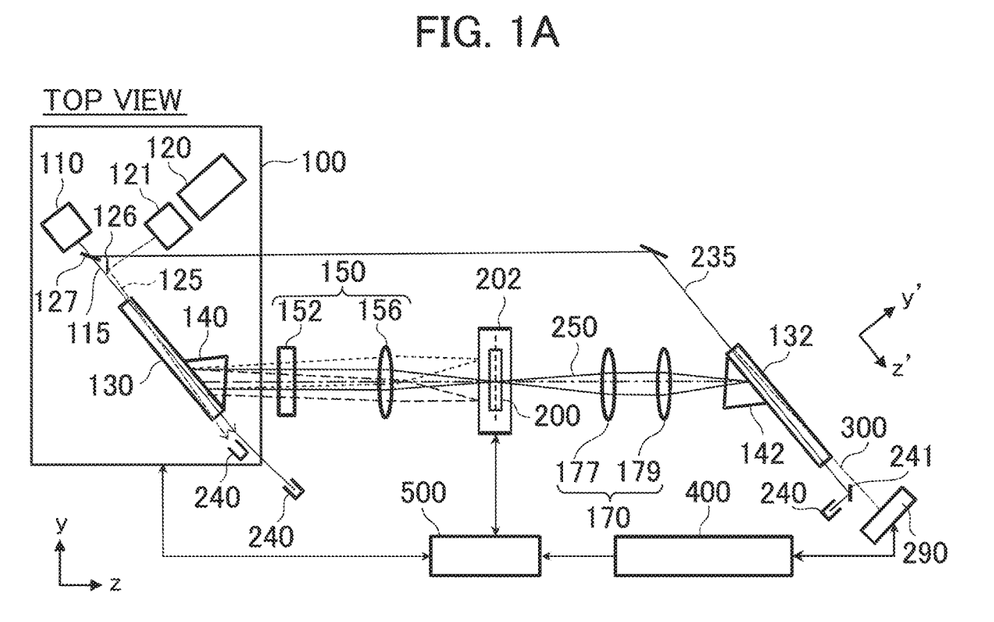
FIG. 1A is a top view illustrating an exemplary configuration of a far-infrared spectroscopic device receiving no technical measure to stabilize output of detection light.

FIG. 1A is a top view illustrating an exemplary configuration of a far-infrared spectroscopic device using light in a far-infrared range and receiving no technical measure to stabilize output of detection light. As a result of examinations on a far-infrared spectroscopic device using light in a normal far-infrared range, the inventors have found various problems that have not been reported. Such problems are now described.

In an is-TPG method, two types of laser light, i.e., pump light 115 having high pulse energy and seed light 125 having a single wavelength, are introduced into a nonlinear optical crystal for generation 130 to parametrically generate pulsed wavelength-variable far-infrared light (is-TPG light) 250 having a single wavelength. At this time, the wavelength of the seed light 125 is varied, and an incident angle of the seed light 125 on the nonlinear optical crystal for generation 130 is adjusted by a seed light incident-angle adjustment mechanism 121, and thus frequency of the generated is-TPG light can be varied. On the other hand, far-infrared light having a broadband wavelength (TPG light) is also slightly generated only by the pump light 115 having high pulse energy.

The generated is-TPG light and TPG light are transmitted through a specimen 200, and then converted into near-infrared light (detection light) 300 in a nonlinear optical crystal for detection 132, and observed by an optical detector 290. Since the TPG light is not controlled in frequency, output of the TPG light is unstable. Further, output of the near-infrared light derived from the TPG light is also unstable. Such unstableness of the TPG light affects output of the detection light 300, causing a problem of unstable output of the detection light. In particular, a larger amount of TPG light is generated at a frequency at which generation efficiency of the is-TPG light is low, leading to low stability of output of the is-TPG light.

In addition, a base having the optics thereon may expand and contract along with a variation in ambient temperature. Such expansion and contraction of the base causes a change in light axis of the optics, which in turn causes a variation in generation efficiency of the wavelength-variable far-infrared light 250 or the detection light 300. As a result, output of the detection light 300 disadvantageously becomes unstable.

In observation of a transmission/absorption spectrum of a specimen to be analyzed, the wavelength-variable far-infrared light 250 may be scattered by particles on the surface or in the inside of the specimen 200, leading to generation of scattering light. Output of the detection light 300 may be changed by a measurement position of the specimen, particle size of a measurement object, a refractive index, or a wavelength of the far-infrared light due to speckle noise caused by such scattering light, and thus output of the detection light disadvantageously becomes unstable.

Hereinafter, a method for stabilizing output of the detection light is described in detail in each embodiment.

2. First Embodiment

Figure 1B:
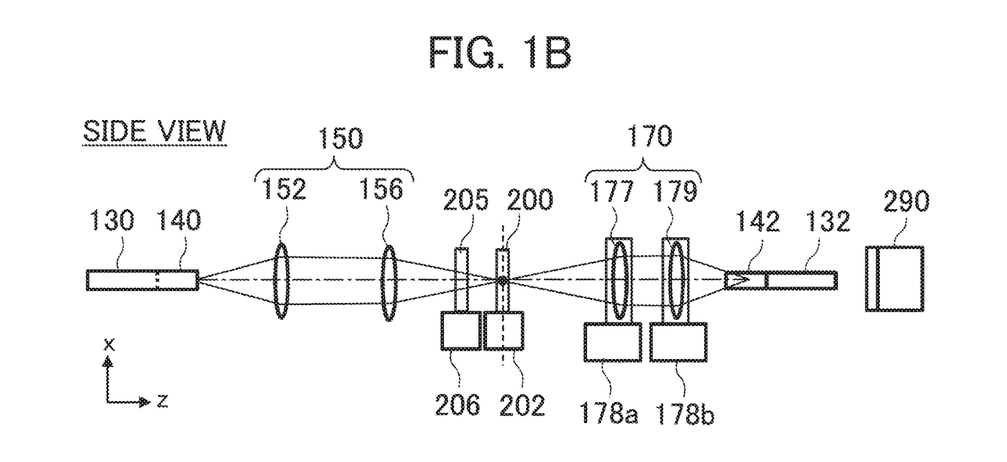
FIG. 1B is a side view illustrating an exemplary configuration of a far-infrared spectroscopic device according to a first embodiment.
Figure 1C:
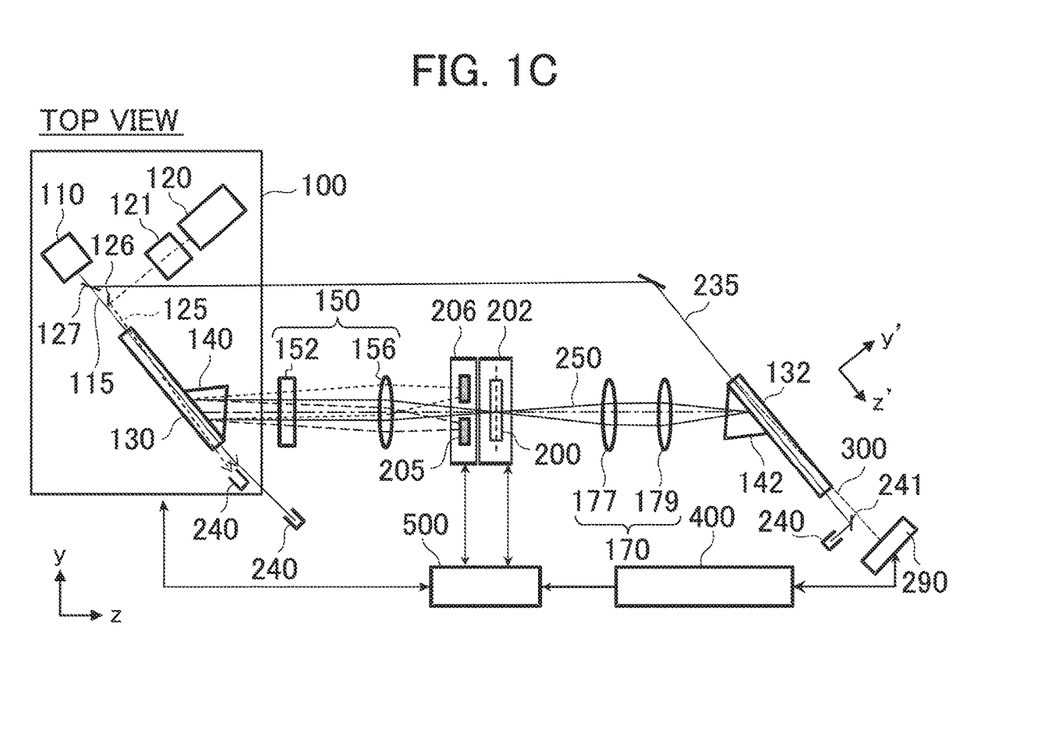
FIG. 1C is a top view illustrating the exemplary configuration of the far-infrared spectroscopic device of the first embodiment.
Figure 1D:
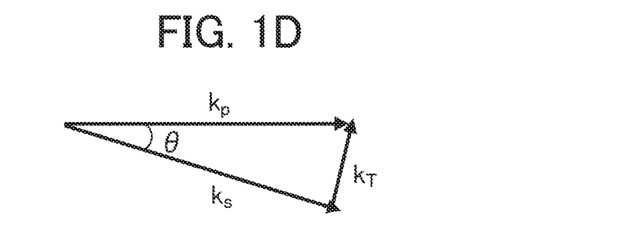
FIG. 1D illustrates an output angle θ of is-TPG light in each embodiment.

FIGS. 1B to 1D are views for explaining an overall configuration example of a far-infrared spectroscopic device according to a first embodiment. FIG. 1B is a side view of the far-infrared spectroscopic device. FIG. 1C is a top view of the far-infrared spectroscopic device. FIG. 1D illustrates an output angle θ of is-TPG light in each embodiment (not limited to the first embodiment).

Summary of Far-Infrared Spectroscopic Device

The far-infrared spectroscopic device shown in FIGS. 1B and 1C uses light transmitted through the specimen 200 to measure an absorption spectrum of the specimen 200. For example, the far-infrared spectroscopic device includes a wavelength-variable far-infrared light source 100, an illumination optics 150, a TPG light removal slit 205, an automatic stage for moving the TPG light removal slit 206 carrying the TPG light removal slit 205, an automatic stage for specimen movement 202 carrying the specimen 200, the far-infrared optics 170, a nonlinear optical crystal for detection 132 that uses pump light generated by the wavelength-variable far-infrared light source 100 and the wavelength-variable far-infrared light 250 from the far-infrared optics 170 to generate near-infrared light (convert the wavelength-variable far-infrared light 250 into the near-infrared light), a Si prism 142 that introduces the wavelength-variable far-infrared light 250 from the far-infrared optics 170 into the nonlinear optical crystal for detection 132, the photodetector 290 that detects the near-infrared light produced through conversion of the wavelength-variable far-infrared light 250, a signal processing unit 400 that performs at least processing of calculating an absorption spectrum of the specimen 200 from the light (for example, near-infrared light) detected by the photodetector 290, and a control unit 500 that controls operation of the automatic specimen moving stage 202 and performs at least processing of displaying a detection signal received from the photodetector 290. The far-infrared optics 170, the Si prism 142, the nonlinear optical crystal for detection 132, and the photodetector 290 may be collectively called photodetection system or detection optics.

The wavelength-variable far-infrared light source 100 includes a pulse laser light source 110 of pump light, a wavelength-variable laser light source 120, the nonlinear optical crystal for generation 130, a half mirror 127 that divides the light, which is output from the pulse laser light source 110, in two, the seed light incident-angle adjustment mechanism 121 that adjusts an incident angle of the seed light 125 on the nonlinear optical crystal for generation 130, a Si prism 140 to extract far-infrared light, and a dumper 240 to capture excess light other than the far-infrared light. For example, a far-infrared light source known as is-TPG method is used as the wavelength-variable far-infrared light source 100. The far-infrared light source in the is-TPG method allows the pump light 115 and the seed light 125, having different wavelengths, to be incident on the nonlinear optical crystal for generation 130 to generate far-infrared light by difference frequency generation or parametric generation. Hereinafter, the far-infrared light generated by this method is referred to as is-TPG light (narrowband far-infrared light).

For example, MgO:LiNbO$_3$ can be used as the nonlinear optical crystal for generation 130, and short-pulse Q switch YAG laser can be used as the pulse laser light source 110 of the pump light 115. Light from the wavelength-variable laser light source 120 is injected as the seed light 125 into the nonlinear optical crystal for generation 130, and thus far-infrared light can be produced by parametric generation. For example, the Si prism 140 is attached to the nonlinear optical crystal for generation 130, and thus the generated far-infrared light can be efficiently extracted. For example, a wavelength of the seed light 125 is varied roughly between 1066 and 1076 nm, and the incident angle of the seed light 125 on the nonlinear optical crystal for generation 130 is adjusted, so that frequency of the generated far-infrared light (is-TPG light) can be varied roughly in a range from 0.5 to 3 THz. The frequency $\omega_T$ of the generated far-infrared light, the frequency $\omega_P$ of the pump light, and the frequency $\omega_S$ of the seed light satisfy the relationship of Formula (1). Variations in wavelength means variations in $\omega_S$.

$$\omega_T = \omega_P - \omega_S \quad (1)$$

The wavenumber $k_T$ of the far-infrared light, the wavenumber $k_P$ of the pump light, and the wavenumber $k_S$ of the seed light satisfy the relationship of Formula (2). Variations in incident angle means variations in $k_S$.

$$k_T = k_P + k_S \quad (2)$$

When the wavelength of the far-infrared light is varied by sweeping the wavelength of the seed light 125 as shown in FIG. 1C, the output angle θ of the generated is-TPG light varies according to Formula (2).

The produced wavelength-variable far-infrared light (is-TPG light) is thrown on the specimen 200 using the illumination optics 150. The far-infrared light (is-TPG light) is transmitted through the specimen 200 and then wavelength-converted into a near-infrared light (detection light 300) having a wavelength of about 1066 to 1076 nm by the nonlinear optical crystal for detection 132. Such a near-infrared light is photoelectrically converted by the photodetector 290 having a sensitivity to near-infrared light, and is detected as a detection signal. The photodetector (sensor) 290 for near-infrared light may be a photodetector (1D array detector) including a plurality of light receiving elements arranged in a one-dimensional array, or a photodetector (2D array detector) including a plurality of light receiving elements arranged in a two-dimensional array. Each of the 1D array detector and the 2D array detector for near-infrared light is relatively easily available, has high response speed, and can be used at normal temperature. The detectors are therefore suitable for industrial applications.

Effect of TPG Light and Technical Measure for Eliminating the Effect

On the other hand, the wavelength-variable far-infrared light source 100 also, but slightly, generates far-infrared light (TPG light (broadband far-infrared light)) having a broad frequency band generated only by the pump light 115 in the nonlinear optical crystal for generation 130. If the configuration as shown in FIG. 1 is used, therefore, the generated TPG light is transmitted together with the is-TPG light by the illumination optics 150, the specimen 200, and the far-infrared optics 170. The TPG light and the is-TPG light transmitted through such components are introduced into the nonlinear optical crystal for detection 132, and are each wavelength-converted together with the detection pump light 235 into a near-infrared light having a broad frequency and detected by the photodetector 290. This signal acts as noise to a detection signal generated by the is-TPG light, and thus affects stability of the detection signal. In addition, since output of the TPG light is unstable, conversion efficiency of the is-TPG light becomes unstable in the nonlinear optical crystal for detection 132, and thus output of the detection light 300 disadvantageously cannot be stably observed. In particular, generation of the near-infrared light derived from the TPG light preferentially occurs, and output of the detection light 300 becomes further unstable in a frequency band in which generation efficiency of the is-TPG light is low in the nonlinear optical crystal for generation 130, in a frequency band in which conversion efficiency of the is-TPG light into the near-infrared light is low in the nonlinear optical crystal for detection 132, or at a frequency at which far-infrared light is strongly absorbed in the specimen 200 but weakly transmitted through the specimen 200 (examples of such frequency bands include a frequency band of 1 THz or less and a frequency band of 3 THz or more). Furthermore, conversion of the TPG light into the near-infrared light consumes energy of the pump light 115, and thus wavelength conversion from the is-TPG light into the near-infrared light cannot be efficiently performed in terms of the conservation law of energy. In case of the far-infrared spectroscopic device having the configuration of FIG. 1A, therefore, detection light is observed in a frequency band other than a frequency band in which conversion efficiency into the near-infrared light is low (for example, a frequency band of 1 THz or less and a frequency band of 3 THz or more as described above). However, in a case of light in the frequency band in which conversion efficiency into the near-infrared light is low, for example, light in the frequency band of 1 THz or less, permeability to a substance (for example, the specimen) is high. In spectroscopy, light in a higher frequency band is more advantageous for analysis because more various peaks of light can be detected. Hence, for example, if light having a frequency of more than 3 THz can be used, analysis efficiency can be improved. The first embodiment therefore provides a measure to allow the frequency band, which has been unused because conversion efficiency into the near-infrared light is low therein, to be usable, i.e., provides a means for removing the TPG light.

Although the is-TPG light is output from the prism 140 at an angle corresponding to the frequency of the far-infrared light as represented by Formula (2), since the TPG light includes a light component caused by the pump light 115, the output angle of the TPG light is not varied even if the wavelength of the seed light 125 is varied. When the is-TPG light and the TPG light having different output angles are condensed on the specimen 200 by a far-infrared light condensing lens 156, condensing spots are spatially different between the is-TPG light and the TPG light. The TPG light is therefore exclusively removed using the TPG light removal slit 205 provided immediately before the specimen 200 on the automatic stage for moving the TPG light removal slit 206. The TPG light has the same polarization as the is-TPG light and thus cannot be removed by a polarizer or the like, and similar pulsed light beams are temporally generated between the two types of light; hence, it is considered to be preferable to spatially remove the TPG light as in this method. In addition to the slit, an iris, a pinhole, a knife-edge, and the like, which may be generally called "TPG light removal filter" or "broadband infrared light removal filter", may be used for a method for removing the TPG light. The slit width, the iris opening, or the pinhole size is desirably made as small as possible to the extent that the is-TPG light is not removed. Furthermore, a material of the slit may be a resin that can absorb the far-infrared light, or a metal that reflects the far-infrared light.

Subsequently, when the wavelength of the seed light 125 is varied to vary the frequency of the is-TPG light, since light is condensed on the specimen 200 by the far-infrared light condensing lens 156 having a focal distance f, displacement Δy of the beam spot of the light is varied according to Formula (3).

$$\Delta y = f \Delta \theta' \quad (3)$$

In Formula (3), f represents the focal distance of the far-infrared light condensing lens 156. The output angle θ' of the far-infrared light varies depending on the wavelength of the far-infrared light. For example, when $\omega_T$ is varied from 1 to 3 THz while using a lens of f=100 mm, the output angle θ' varies by Δθ'=θ' (1 THz)−θ' (3 THz)=3.5 degrees (0.58 rad), so that Δy=5.8 mm is given.

When the TPG light removal slit 205 shielding the TPG light component is moved by the automatic stage for moving the TPG light removal slit 206 for each frequency according to Formula (3), only an is-TPG light having a desired frequency can be always extracted. At this time, when the specimen 200 is simultaneously moved by the automatic stage for specimen movement 202, a position of the is-TPG light incident on the specimen 200 is not varied (the control unit 500 controls movement of the automatic stage for specimen movement 202 such that the respective beams of is-TPG light having different frequencies are thrown on the same position on the specimen 200), and light can be measured at the same position on the specimen 200 at all frequencies.

In this way, the TPG light is not introduced into the nonlinear optical crystal for detection 132. Only the is-TPG light is introduced into nonlinear optical crystal for detection 132. Hence, only the is-TPG light is wavelength-converted, and thus stable output of the detection light 300 can be produced. In addition, energy of the pump light 235 is not consumed for conversion of the TPG light into the near-infrared light during wavelength conversion. Consequently, conversion efficiency of the is-TPG light can be increased, and thus the detection light can be observed even in a frequency band in which output of the far-infrared light is weak, advantageously leading to expansion of a detectable frequency band.

Modifications
(i) Case of Using Imaging Optics as Illumination Optics

In the first embodiment, the illumination optics 150 configures no imaging optics. Hence, although the TPG light removal slit 205 is disposed immediately before the specimen 200, the TPG light removal slit 205 may be disposed at any position on the light path of the far-infrared light and is moved in correspondence to a relevant frequency at each position. On the other hand, when an imaging optics is used as the illumination optics 150, since the is-TPG light and the TPG light are condensed at the same position by the far-infrared light condensing lens 156, the TPG light removal slit 205 for removing the TPG light is preferably disposed immediately before a lens 152.

(ii) Processing by Signal Processing Unit

It is desirable to prevent a reduction in signal to noise ratio (S/N) due to noise, such as noise in the photodetector 290 itself or noise caused by scattering light of visible light or near-infrared light in the inside of the device, and due to a TPG component generated only by the nonlinear optical crystal for detection 132. The signal processing unit 400 may therefore subtract a signal intensity, which is obtained when the far-infrared light is blocked, from intensity of a measured signal (detected signal) before processing. When size of the detection light is small compared to size of the detector, the signal processing unit 400 may send a value, which is obtained by integrating light intensity over a specific area having detection light on the detector, as detection light intensity to the control unit 500. Furthermore, since a beam position of the detection light varies when frequency is swept, the signal processing unit 400 may perform control to follow an area of a signal to be processed. As with the detection light, since the noise component also has different intensities depending on positions, noise in a corresponding area needs to be measured for each frequency.

3. Second Embodiment

Figure 2A:
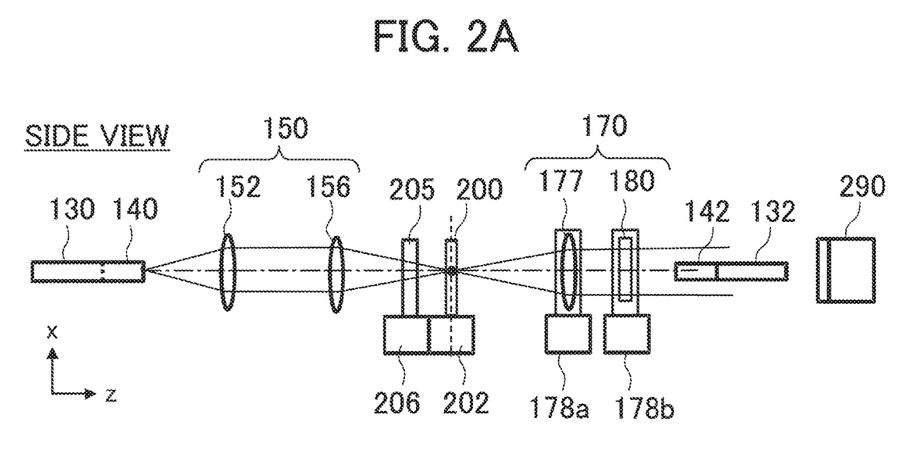
FIG. 2A is a side view of a far-infrared spectroscopic device according to a second embodiment.
Figure 2B:
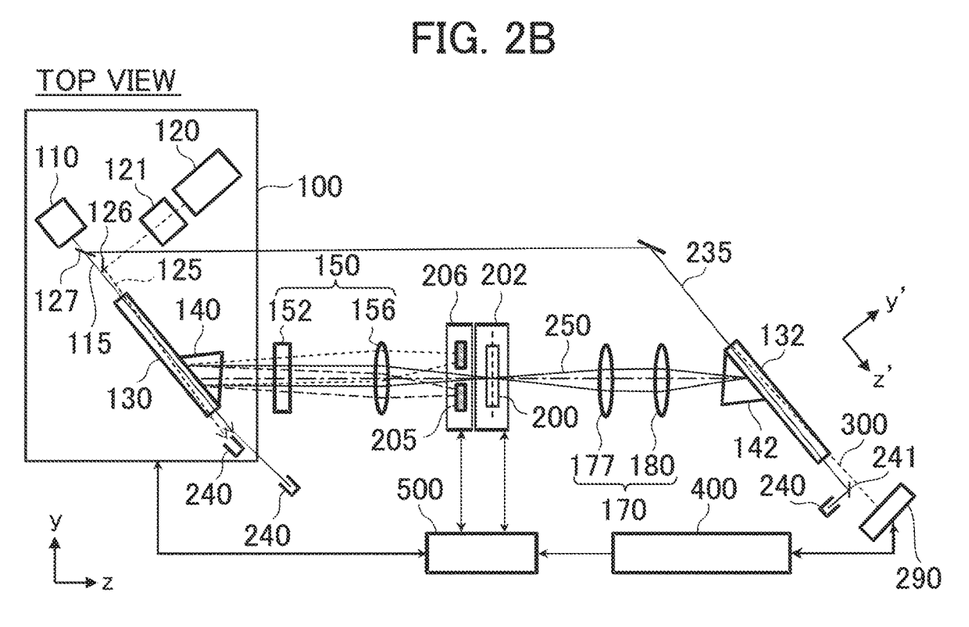
FIG. 2B is a top view of the far-infrared spectroscopic device of the second embodiment.
Figure 2C:
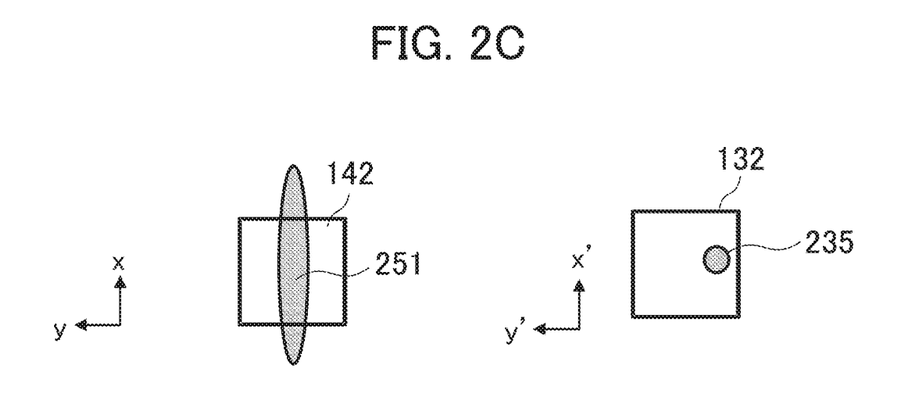
FIG. 2C is a view for explaining a relationship between a spot shape of far-infrared light and a spot of pump light.

FIG. 2 includes views illustrating an overall configuration example of a far-infrared spectroscopic device according to a second embodiment of the disclosure. FIG. 2A is a side view of the far-infrared spectroscopic device of the second embodiment. FIG. 2B is a top view of the far-infrared spectroscopic device of the second embodiment. FIG. 2C is a view for explaining a relationship between a spot shape of far-infrared light and a spot of pump light. As described below, the second embodiment makes it possible to stabilize output of the detection light against temperature change over a long period, and provide afar-infrared spectroscopic device suitable for industrial use.

Response to Angular Variation in Light Axis Due to Ambient Temperature Variation In the second embodiment, the illumination optics 150, the far-infrared optics 170, the pulse laser light source 110, and the wavelength-variable laser light source 120 are all provided on a base plate in a y-z plane. Hence, if ambient temperature is varied, a light axis of the laser light from the pulse laser light source 110 or the wavelength-variable laser light source 120 is varied (particularly in the x direction) due to deflection caused by thermal expansion of the base plate, or the like. For example, if temperature variation occurs, the light axis is greatly varied in a direction (x direction) perpendicular to the ground in characteristics of an optical element mount. In such a situation, if the far-infrared light is isotropically condensed onto the nonlinear optical crystal for detection 132 by a lens, the light axis is displaced in the x direction due to a variation in ambient temperature, and a coupling condition between the pump light 235 and the wavelength-variable far-infrared light 250 is changed in the nonlinear optical crystal for detection 132, and thus generation efficiency of the detection light is varied, leading to a change in output of the detection light. In particular, if an angle of the light axis of the pump light 235 is varied on an upstream side (for example, in the inside or the vicinity of the wavelength-variable far-infrared light source 100), since light path length from the pulse laser light source 110 to the nonlinear optical crystal for detection 132 is long, several meters, the angular variation in the light axis affects optical overlap between the pump light 235 and the wavelength-variable far-infrared light 250 in the nonlinear optical crystal for detection 132, leading to a change in generation efficiency of the detection light 300. As a result, output of the detection light 300 is unstable over a long period.

In introduction of the wavelength-variable far-infrared light 250 into the nonlinear optical crystal for detection 132, therefore, a far-infrared light cylindrical lens 180 is used in place of an isotropic convex lens 179 used in the first embodiment to allow the wavelength-variable far-infrared light 250 to be condensed only in the y direction rather than in the x direction such that the output of the detection light 300 becomes insensitive to beam displacement of the pump light 235 in a perpendicular direction (x direction). At this time, the spot size 251 of the wavelength-variable far-infrared light 250, which is introduced into the nonlinear optical crystal for detection 132 and the Si prism 142, on the nonlinear optical crystal for detection 132 is preferably set to have a size several times larger than a crystal size in the x direction. This makes it possible to produce output of the detection light stably over a long term without a significant variation in efficiency of conversion into the near-infrared light even if the pump light 235 moves in a range in the x direction of the spot size 251 of the far infrared light.

The beam of the wavelength-variable far-infrared light 250 may be condensed using anisotropic lens while beam diameter of the pump light 235 is extended in the x direction. In such a case, however, crystal damage is a concern, and a coupling condition of the wavelength-variable far-infrared light 250 with the pump light 235 is supposed to be worsened. Hence, the exemplary configuration of the second embodiment is desirably used.

Modification (Photodetector)

The detection light 300 is measured by the photodetector 290 configured of the 1D array detector or the 2D array detector. Although output of the detection light 300 can be stabilized by using the described far-infrared light cylindrical lens 180, a beam position is shifted. To response to this, therefore, the photodetector 290 may be mounted on an automatic stage such that the photodetector 290 can be moved in correspondence to a variation in beam position of the detection light. Alternatively, an image of the near-infrared light generated in the nonlinear optical crystal for detection 132 may be formed on the photodetector 290 using a lens so that an image of the detection light is always formed at the same position.

4. Third Embodiment

Figure 3:
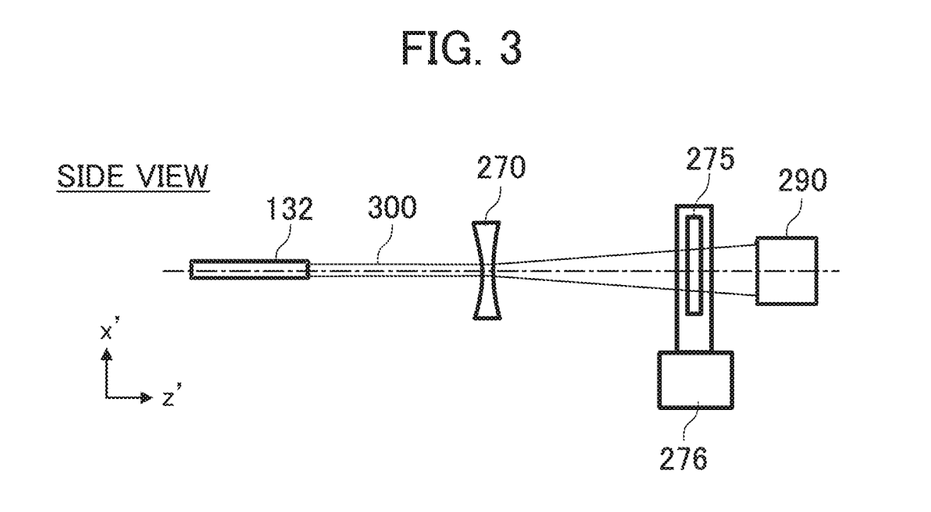
FIG. 3 illustrates an exemplary configuration of a detection optics of a far-infrared spectroscopic device of a third embodiment.

A far-infrared spectroscopic device according to a third embodiment has the same configuration as that of the far-infrared spectroscopic device of the first embodiment except for a configuration of the detection optics. FIG. 3 illustrates an exemplary configuration of the detection optics of the far-infrared spectroscopic device of the third embodiment. However, FIG. 3 shows a configuration subsequent to the nonlinear optical crystal for detection 132 (a mirror 241 and a dumper 240 are omitted).

Configuration of Detection Optics

The detection optics includes the nonlinear optical crystal for detection 132, a concave cylindrical lens 270, a neutral density (ND) filter 275, an automatic rotational stage 276 to rotate the ND filter 275, and the photodetector (array detector) 290. As in the first and second embodiments, the detection optics uses the nonlinear optical crystal for detection 132 to parametrically generate near-infrared light using the wavelength-variable far-infrared light 250 and the pump light 235, and thus makes it possible to detect the far-infrared light at high sensitivity. In the detection optics of the third embodiment, however, since output of the near-infrared detection light is high, the pump light 235 is separated by the mirror 241 and then appropriately dimmed by the ND filter 275 or the like such that a signal to the photodetector 290 is not saturated, and then the dimmed light is introduced into the photodetector 290. Since intensity of the detection light is different depending on far-infrared absorbance of the specimen 200, the ND filter 275 must include a plurality of ND filters having different densities. The ND filters having different densities (ND filters used to attenuate light having extremely high luminance are different depending on specimens) are mounted on the automatic rotational stage 276 and used while being switched from one another, thereby various types of specimens can be accurately analyzed. A single filter having a gradually varying density may be used as the ND filter 275. When an ND filter 275 having a low density is used, light reflected by the back of the ND filter 275 is reflected again by the surface thereof and introduced into the photodetector 290, and may interfere with the detection light 300. To prevent this, anti-reflection (AR) coat may be applied to one or both of the sides of the ND filter 275.

Reduction in Measurement Time

A large number of times of switching between the ND filters 275 may lead to long measurement time of the near-infrared light. However, since it is important to reduce the measurement time in industrial use, the number of times of switching between the ND filters 275 is preferably as small as possible. The signal detected by the photodetector 290 is importantly prevented from being saturated to reduce the number of times of switching between the ND filters 275. The inventors have therefore considered that beam diameter of the detection light 300 is adjusted to reduce energy density at the beam center of the detection light 300.

For example, beam diameter of the detection light 300 introduced into the photodetector 290 is about 1 to 2 mm in accordance with the beam diameter of the pump light 235 introduced into the nonlinear optical crystal for detection 132. The beam diameter of this size has a high energy density at the center of the detection light 300. The inventors have therefore inserted the concave cylindrical lens 270 between the nonlinear optical crystal for detection 132 and the ND filter 275 to expand the beam diameter in the x' direction, thereby have reduced energy density at the beam center of the detection light 300 and thus succeeded in allowing a signal from the photodetector 290 to be less likely to be saturated. As a result, the detection light 300 can be observed over a wide energy range even if the density of the ND filter 275 is not frequently changed. Although the concave cylindrical lens 270 is used in the third embodiment, a homogenizer or the like may be used to form a top hat beam to reduce the energy density at the beam center.

Relationship Between Pump Light Separation and Expansion Direction of Beam Diameter The pump light 235 must be spatially separated from the detection light 300 before introducing the detection light 300 into the photodetector 290. For example, if an isotropic concave lens is used instead of the concave cylindrical lens, the beam diameter is also expanded in the y' direction. As a result, the pump light 235 is difficult to be separated from the detection light 300. It is therefore important to extend the beam in the x' direction.

Alternatively, the detection light 300 may be isotropically expanded after separation of the pump light 235. In such a case, however, detectable frequencies are limited by the size in the y' direction of the photodetector 290. To collectively consider the above-described reason, therefore, this far-infrared spectroscopic analysis method importantly uses the concave cylindrical lens 270 to extend the detection light only in the x' direction.

5. Fourth Embodiment

Figure 4A:
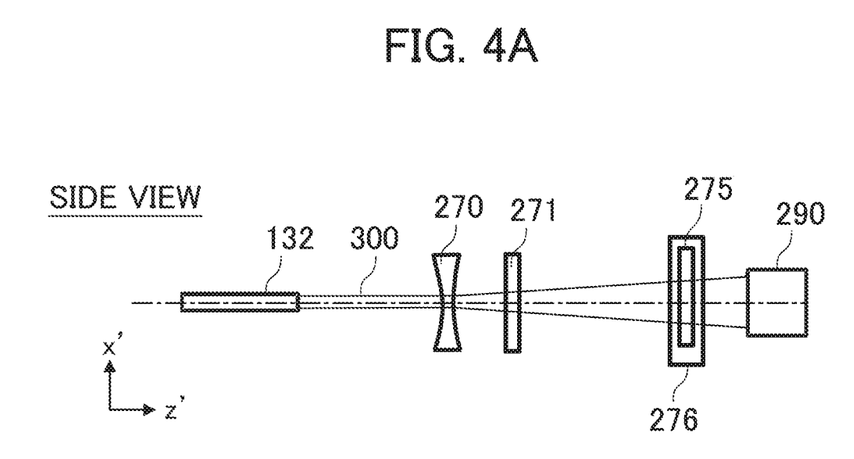
FIG. 4A is a side view illustrating an exemplary configuration of a detection optics of a far-infrared spectroscopic device of the third embodiment.
Figure 4B:
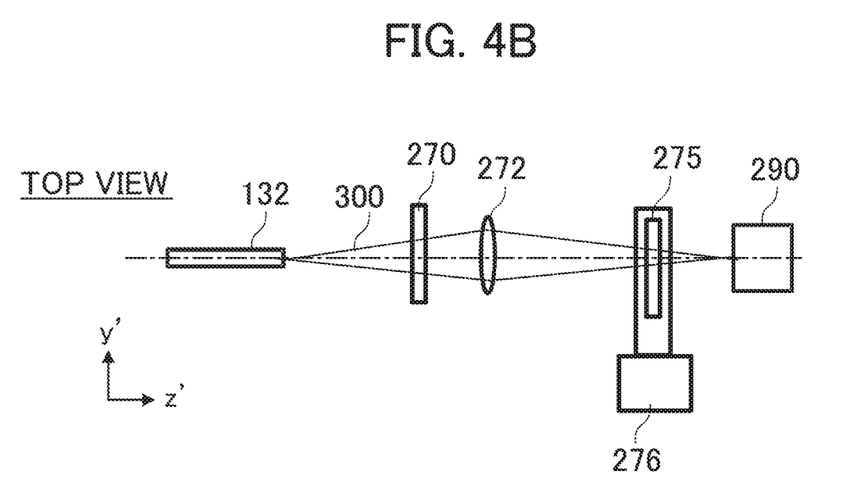
FIG. 4B is a top view illustrating the exemplary configuration of the detection optics of the far-infrared spectroscopic device of the third embodiment.

A far-infrared spectroscopic device according to a fourth embodiment has the same configuration as that of the far-infrared spectroscopic device of the first embodiment except for a configuration of the detection optics. FIG. 4 include views illustrating an exemplary configuration of the detection optics of the far-infrared spectroscopic device of the fourth embodiment. FIG. 4A is a side view of the detection optics, and FIG. 4B is a top view thereof. However, FIG. 4 show a configuration subsequent to the nonlinear optical crystal for detection 132 (a mirror 241 and a dumper 240 are omitted).

Configuration of Detection Optics

The detection optics includes the nonlinear optical crystal for detection 132, the concave cylindrical lens 270, a detection light imaging optics 271 that corrects a light condensing position of the detection light 300, the ND filter 275, the automatic rotational stage 276 that rotates the ND filter 275, and the photodetector (array detector) 290.

The detection optics cuts the pump light 235 by the mirror 241 (not shown in FIG. 4, see FIG. 1B and the like) to prevent strong pump light 235 from entering the photodetector 290. To achieve this, the mirror 241 must be kept away by several tens of centimeters from the nonlinear optical crystal for detection 132 such that the detection light 300, which is generated at an angle slightly different from the angle of the pump light 235, can be spatially separated from the pump light 235. At this time, since the photodetector 290 is disposed such that a distance from the nonlinear optical crystal for detection 132 to the photodetector 290 is larger than the distance of several tens of centimeters, detectable frequencies are disadvantageously limited by the size in the y' direction of the photodetector 290. To overcome such a disadvantage, the inventors use a configuration where after the pump light 235 is separated, an image of the detection light 300 immediately after passing through the nonlinear optical crystal for detection 132 is formed only in the y' direction on the photodetector 290 by the detection light imaging optics 271. As a result, even if the frequency of the wavelength-variable far-infrared light 250 and the frequency of the detection light 300 are each varied in accordance with a variation in frequency of the seed light 125, the detection light 300 can be observed at the same position without shift of the beam position of the detection light 300 on the photodetector 290. Consequently, the detectable frequencies is not limited by the size in the y' direction of the photodetector 290 unlike in the third embodiment. According to the fourth embodiment, the traditionally used 2D array sensor can be replaced with a 1D array sensor in the x' direction, and thus the detection light can be detected at low cost in industrial use.

Since the beam diameter must be expanded in the x' direction to secure a dynamic range as in the third embodiment, the detection light imaging optics 271 is important to be an imaging optics only in the y' direction.

6. Fifth Embodiment

Although the wavelength-variable far-infrared light 250 is converted into near-infrared light in the photodetection system in the far-infrared spectroscopic device of each of the first to fourth embodiments, a far-infrared spectroscopic device of a fifth embodiment uses a configuration where the photodetection system directly detects the wavelength-variable far-infrared light 250 without conversion. Although the first to fourth embodiments each solves unstableness of output of the detection light 300 due to the optics, the fifth embodiment solves unstableness of output of the detection light due to scattering light on a surface of in the inside of the specimen 200.

Influence of Scattering Light

In observation of a transmission/absorption spectrum, the wavelength-variable far-infrared light 250 having a wavelength of several tens to several hundreds of micrometers is condensed on the specimen 200. Hence, when a particle contained in the specimen 200 has a diameter equal to or larger than the wavelength, the wavelength-variable far-infrared light 250 condensed on the specimen 200 may be strongly scattered on the surface or in the inside of the specimen 200. For example, a pharmaceutical tablet often contains particles each having a diameter equal to or larger than the wavelength of the far-infrared light.

When part of the far-infrared light condensed on the specimen 200 is scattered on the surface or in the inside of the specimen 200, the far-infrared light has a spatially random intensity distribution (speckle noise). When the far-infrared light having the speckle noise and the pump light 235 are wavelength-converted into near-infrared light by the nonlinear optical crystal for detection 132, the near-infrared light resulted from the conversion inherits the speckle noise. When a position of the specimen 200 is changed, since the speckle noise is changed as well, output of the detection light is also changed. Furthermore, although the nonlinear optical crystal for detection 132 has a polarization angle range (allowable range for polarization) within which far-infrared light can be converted into near-infrared light, if polarization rotates beyond the allowable range due to scattering, the objective far-infrared light cannot be wavelength-converted and thus becomes unobservable (undetectable). In addition, since the speckle noise is varied depending not only on the position of the specimen 200 but on the particle size or refractive index of the specimen 200 or on a wavelength of the far-infrared light, the speckle noise greatly affects observation of the absorption spectrum.

When light transmitted through the specimen 200 is observed, whether the light is resulted from absorption or scattering by the specimen cannot be distinguished only by the information of the transmitted light. It is therefore necessary to detect the scattering light in order to accurately detect the amount of absorption by the specimen 200 for analysis.

The far-infrared spectroscopic device of the fifth embodiment therefore has a configuration by which such scattering light can be efficiently detected.

Configuration of Far-Infrared Spectroscopic Device

FIG. 5 include views illustrating an exemplary configuration of the far-infrared spectroscopic device according to the fifth embodiment. FIG. 5A is a side view of the far-infrared spectroscopic device (but illustrating only a configuration subsequent to the nonlinear optical crystal for generation 130), and FIG. 5B is a top view of the far-infrared spectroscopic device. FIG. 5C illustrates an exemplary configuration of a far-infrared light imaging optics. FIG. 5D is a side view illustrating an exemplary configuration of a far-infrared spectroscopic device (but illustrating only a configuration subsequent to the nonlinear optical crystal for generation 130) according to a modification of the fifth embodiment.

(i) Basic Configuration

Figure 5A:
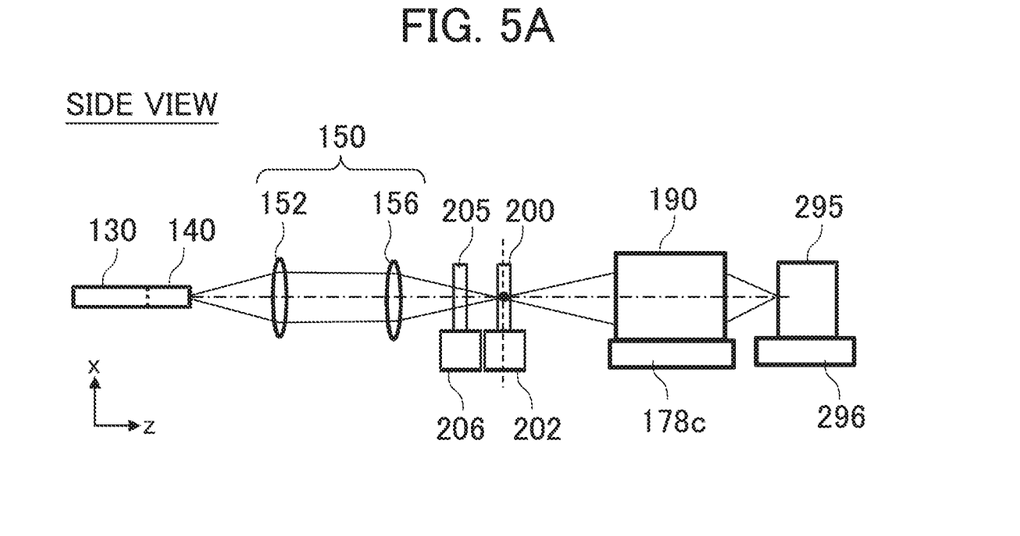
FIG. 5A is a side view illustrating an exemplary configuration of a far-infrared spectroscopic device according to a fifth embodiment.
Figure 5B:
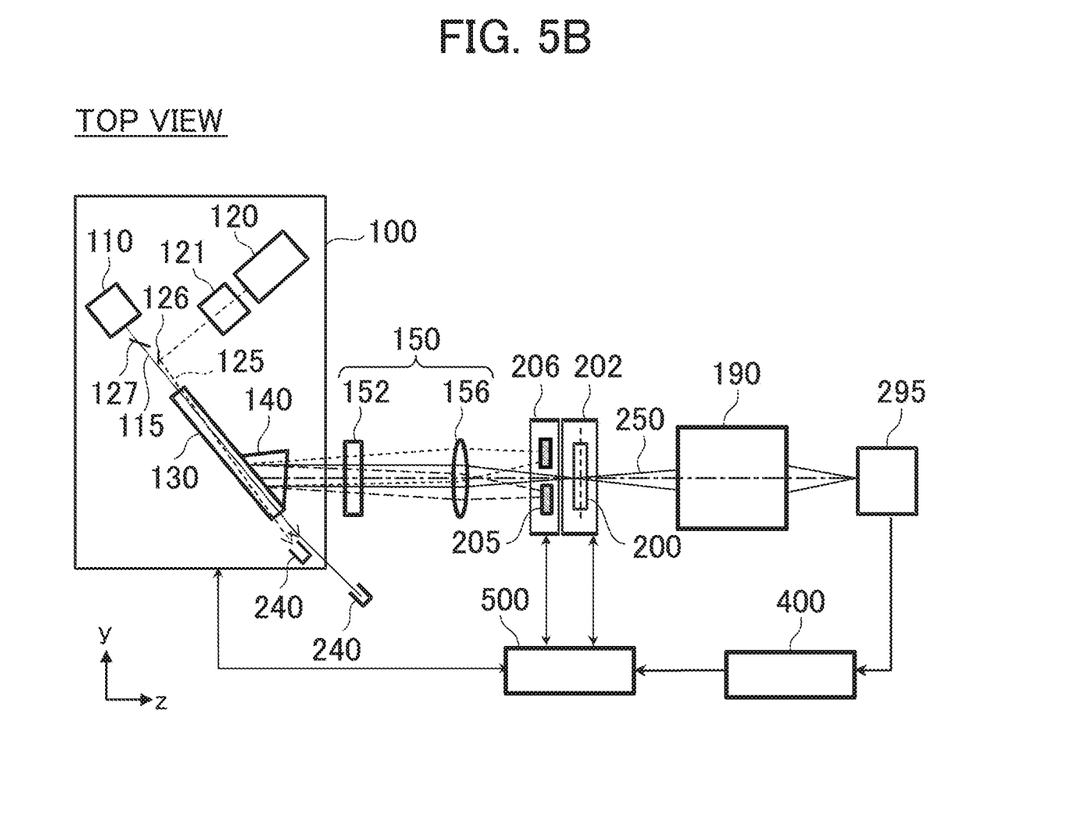
FIG. 5B is a top view illustrating the exemplary configuration of the far-infrared spectroscopic device of the fifth embodiment.

For example, the far-infrared spectroscopic device of the fifth embodiment includes the wavelength-variable far-infrared light source 100, the illumination optics 150, the TPG light removal slit 205, the automatic stage for moving the TPG light removal slit 206 carrying the TPG light removal slit 205, the automatic stage for specimen movement 202 carrying the specimen 200, afar-infrared light imaging optics 190 that images the wavelength-variable far-infrared light 250 transmitted through the specimen 200, an automatic stage for the far-infrared light imaging optics 178c carrying the far-infrared light imaging optics 190, a far-infrared photodetector 295 detecting the wavelength-variable far-infrared light 250 imaged by the far-infrared light imaging optics 190, and an automatic stage for the far-infrared photodetector 296 carrying the far-infrared photodetector 295. The far-infrared light imaging optics 190 and the far-infrared photodetector 295 may be collectively called photodetection system or detection optics.

As shown in FIGS. 5A and 5B, unlike in the first to fourth embodiments, the fifth embodiment has a configuration where the far-infrared light condensed on the specimen 200 is not wavelength-converted into near-infrared light and is imaged on the far-infrared photodetector 295 using the far-infrared light imaging optics 190 provided on the automatic stage for the far-infrared light imaging optics 178c and thus directly detected in order to allow the scattering light from the specimen 200 to be efficiently detected. In that configuration, when frequency of the wavelength-variable far-infrared light 250 is varied, the automatic stage for the far-infrared light imaging optics 178c and the automatic stage for the far-infrared photodetector 296 are used to move the far-infrared light imaging optics 190 and the far-infrared photodetector 295 in the y direction together with the TPG light removal slit 205 and the specimen 200, and thus the wavelength-variable far-infrared light 250 is efficiently captured in the far-infrared photodetector 295. In more detail, when frequency of the wavelength-variable far-infrared light 250 is varied, since an incident angle of the seed light 125 on the nonlinear optical crystal for generation 130 and the wavelength of the seed light 125 are adjusted, at least one of the positions of the automatic stage for specimen movement 202, the automatic TPG-light-removal-slit moving stage 206, the automatic stage for the far-infrared light imaging optics 178c, and the automatic stage for the far-infrared photodetector 296 is adjusted by the control unit 500 (the stage is moved to change a spatial position of a component carried by the stage). This makes it possible to accurately cut the TPG light by the filter (TPG light removal slit 205) and condense the far-infrared light (is-TPG light) at the same place on the specimen 200. Furthermore, it is possible to accurately image the wavelength-variable far-infrared light 250 (is-TPG light) on the far-infrared photodetector 295 by the far-infrared light imaging optics 190 and thus efficiently detect the wavelength-variable far-infrared light 250.

Figure 5C:
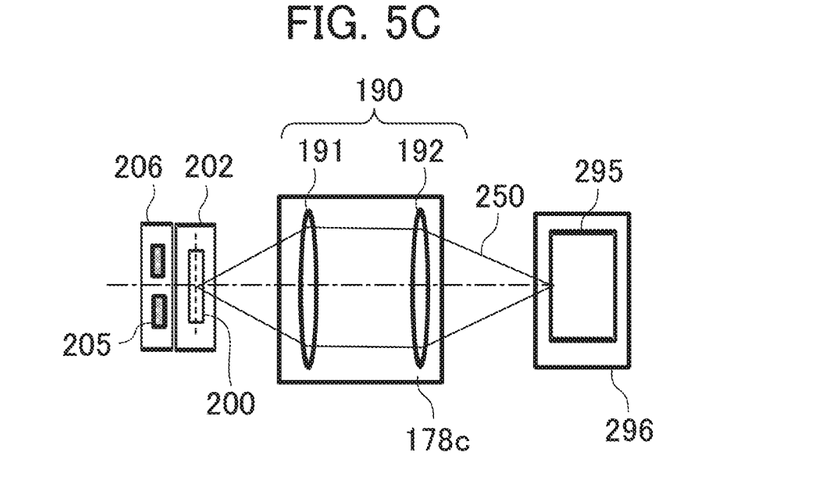
FIG. 5C illustrates an exemplary configuration of a far-infrared light imaging optics of the far-infrared spectroscopic device of the fifth embodiment.

As shown in FIG. 5C, the far-infrared light imaging optics 190 includes a combination of far-infrared light lenses 191 and 192 so that the wavelength-variable far-infrared light 250 condensed on the specimen 200 can be collimated and then condensed on the far-infrared photodetector 295. Use of such a configuration makes it possible to efficiently observe the forward-scattered light.

On the other hand, for example, a pyroelectric sensor or a bolometer having one light receiving element, or a photodetector (1D array detector) including light receiving elements arranged in a one-dimensional array, or a photodetector (2D array detector) including a plurality of light receiving elements arranged in a two-dimensional array may be used as the far-infrared photodetector 295 to detect the wavelength-variable far-infrared light 250. Since a signal output from the far-infrared photodetector 295 is extremely weak, lock-in amplifier detection is probably suitable.

(ii) Modification

Figure 5D:
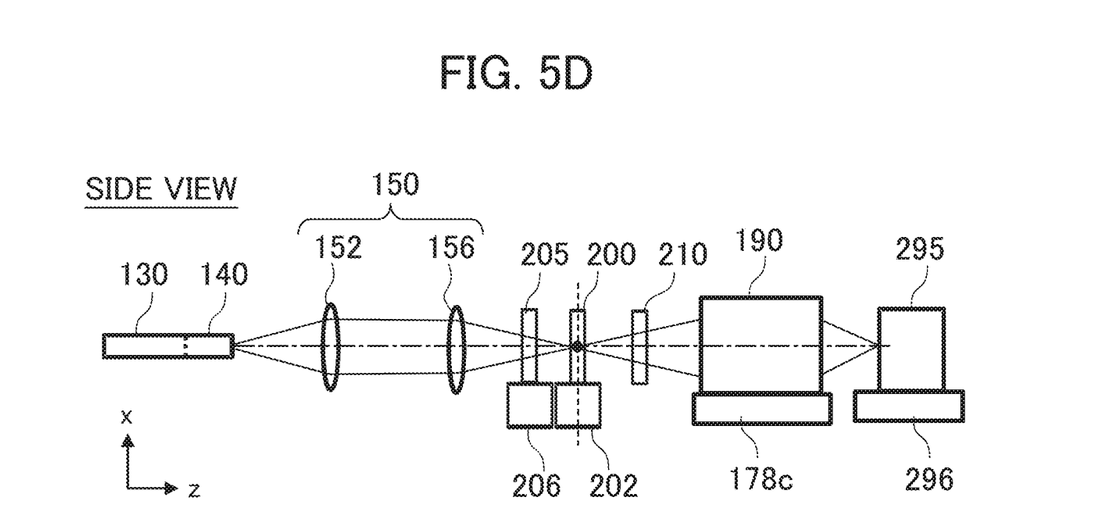
FIG. 5D is a side view illustrating an exemplary configuration of a far-infrared spectroscopic device according to a modification of the fifth embodiment.

FIG. 5D is the side view illustrating the exemplary configuration of the far-infrared spectroscopic device (but illustrating only the configuration subsequent to the nonlinear optical crystal for generation 130) according to the modification of the fifth embodiment. The far-infrared spectroscopic device of the modification includes the configuration shown in FIGS. 5A and 5B, and besides includes a diffuser plate (diffuser component) 210 so as not to be affected by speckle noise caused by scattering light. The diffuser plate 210 is inserted, for example, between the specimen 200 and the far-infrared light imaging optics 190 on the far-infrared light axis. Although the speckle noise can be removed by moving or rotating the diffuser plate 210 at high speed (since the scattering light cannot be entirely detected, the diffuser plate is rotated to allow temporal and spatial random noise (speckle noise) caused by the scattering light to be temporally averaged and observed), advantageous effects can also be probably expected by using that configuration in the fifth embodiment. A mechanism that moves or rotates the specimen 200 at high speed may be provided in place of the diffuser plate 210.

Modifications of Far-Infrared Light Imaging Optics

Figure 6A:
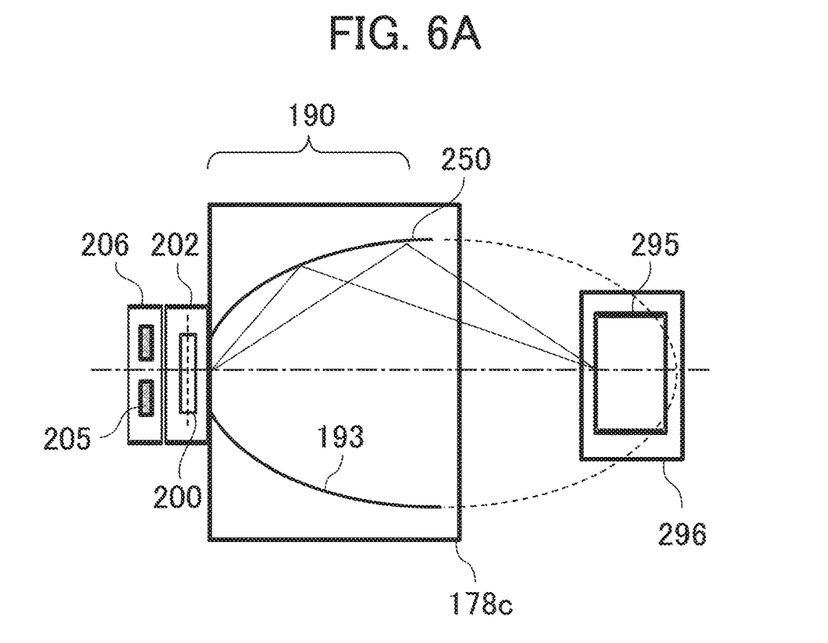
FIG. 6A illustrates a configuration of a first modification of a far-infrared light imaging optics 190 of the far-infrared spectroscopic device of the fifth embodiment.
Figure 6B:
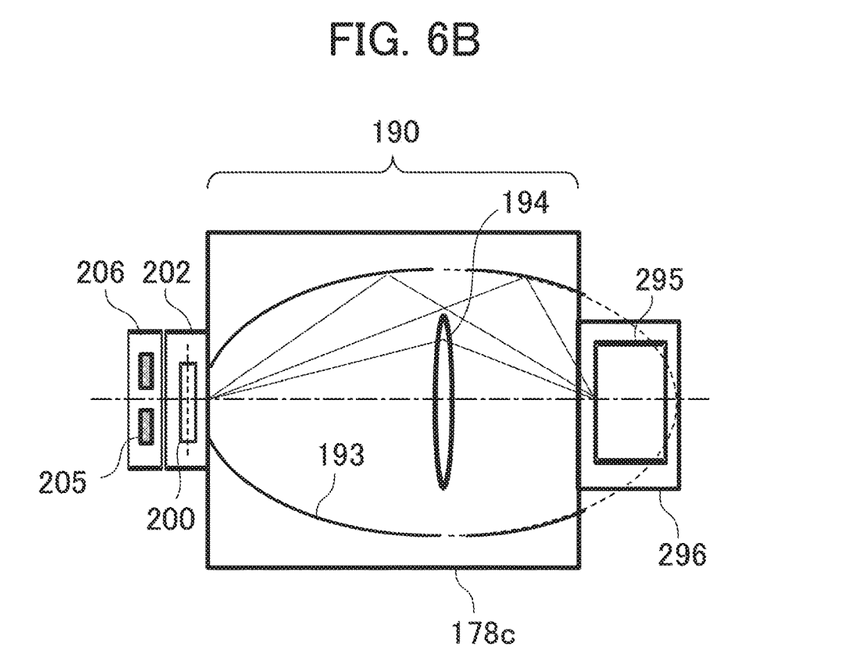
FIG. 6B illustrates a configuration of a second modification of the far-infrared light imaging optics 190 of the far-infrared spectroscopic device of the fifth embodiment.
Figure 6C:
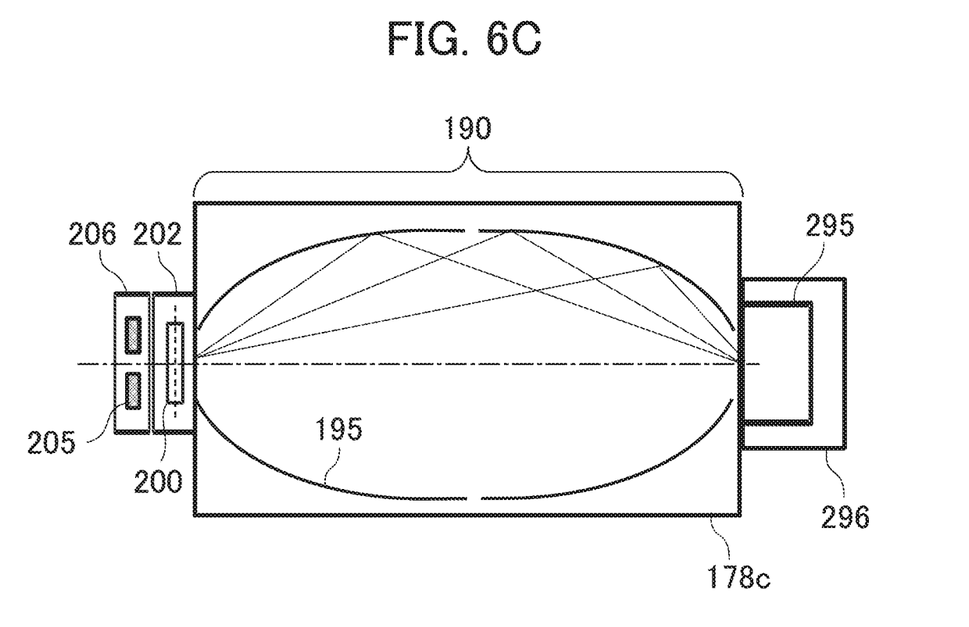
FIG. 6C illustrates a configuration of a third modification of the far-infrared light imaging optics 190 of the far-infrared spectroscopic device of the fifth embodiment.

While FIG. 5C illustrates the basic configuration of the far-infrared light imaging optics 190, FIG. 6 illustrate configurations of modifications of the far-infrared light imaging optics 190. FIGS. 6A to 6C illustrate the configurations of the first to third modifications of the far-infrared light imaging optics 190.

(i) First Modification

In the first modification (FIG. 6A), an elliptic mirror 193 is applied to the far-infrared light imaging optics 190. In the first modification, as with the above-described basic configuration, when frequency of the wavelength-variable far-infrared light 250 is varied, the far-infrared light imaging optics 190 and the far-infrared photodetector 295 are preferably moved in the y direction together with the TPG light removal slit 205 and the specimen 200 so that the wavelength-variable far-infrared light 250 is efficiently captured in the photodetector.

(ii) Second Modification

Although a larger amount of scattering light, which spreads in a wide angle and is difficult to be observed, can be collected by using the above-described basic configuration, the forward-scattered light can also be detected by adding a lens for far-infrared light 194 to the far-infrared light imaging optics of the first modification (FIG. 6A) as shown in FIG. 6B.

(iii) Third Modification

As shown in FIG. 6C, the far-infrared light imaging optics 190 of the third modification has a configuration including a combination of two composite paraboloidal mirrors (Winston cones) 195. In the case of using such a configuration, as with the above-described basic configuration, when frequency of the wavelength-variable far-infrared light 250 is varied, the far-infrared light imaging optics 190 and the far-infrared photodetector 295 are desirably moved in the y direction together with the TPG light removal slit 205 and the specimen 200 so that the wavelength-variable far-infrared light 250 is efficiently captured in the photodetector. Use of such a configuration makes it possible to efficiently collect the scattering light spreading in a wide angle and the forward-scattered light.

7. Conclusion (i) These embodiments provide a technique to improve short/long-term stability of detection light intensity and stability of detection light intensity independent of particle size or a refraction index of the specimen in the far-infrared spectroscopic device using the is-TPG method.

(ii) In the embodiments, the TPG light is removed by the filter (for example, the TPG light removal slit 205) provided on the automatic stage for moving the TPG light removal slit 206 immediately before the specimen 200 so that the TPG light is not introduced into the nonlinear optical crystal for detection 132. When a wavelength of the wavelength-variable far-infrared light 250 is varied, since a generation direction of that far-infrared light is varied, a position of the TPG light removal slit 205 is preferably moved by the automatic stage for moving the TPG light removal slit 206 so that the is-TPG light is exclusively transmitted while the TPG light is removed.

A change in ambient temperature may result in deformation (expansion and contraction) of an optics base carrying the far-infrared spectroscopic device due to the temperature change (change in carrying plane). In such a case, a light axis of the pump light 235 introduced into the nonlinear optical crystal for detection 132 may be shifted largely in a perpendicular direction (x direction in FIG. 2C) with respect to the optics base. Hence, when the wavelength-variable far-infrared light 250 is introduced into the nonlinear optical crystal for detection 132, the far-infrared light is condensed using the far-infrared light cylindrical lens 180 so that the beam diameter of the wavelength-variable far-infrared light 250 is sufficiently made larger than the amount of beam shift of the pump light 235. As a result, even if a beam of the pump light 235 is shifted in the x direction, it can be expected that generation efficiency of the detection light 300 is advantageously less likely to be changed.

Further, speckle noise may occur due to the scattering light on the surface or in the inside of the specimen 200, leading to unstable output of the detection light 300. To reduce influence of such unstable output, the wavelength-variable far-infrared light 250 is detected using the far-infrared light imaging optics 190 provided on the automatic stage for the far-infrared light imaging optics 178c and the far-infrared photodetector 295 provided on the automatic stage for the far-infrared photodetector 296 without using the nonlinear optical crystal for detection 132. When frequency of the is-TPG light is varied, positions of the far-infrared light imaging optics 190 and the far-infrared photodetector 295 are moved in at least one direction in correspondence to the frequency using at least one of the automatic stage for the far-infrared light imaging optics 178c and the automatic stage for the far-infrared photodetector 296 to allow efficient observation.

(iii) In this way, output stability of the detection light increases over short and long terms, making it possible to improve quantitative analysis accuracy of the far-infrared spectrometer.

LIST OF REFERENCE SIGNS

100 Wavelength-variable far-infrared light source
110 Pulse laser light source
120 Wavelength-variable laser light source
121 Seed light incident-angle adjustment mechanism
115 Pump light
125 Seed light
127 Half mirror
130 Nonlinear optical crystal for generation
132 Nonlinear optical crystal for detection
140, 142 Si prism
150 Illumination optics
156 Far-infrared light condensing lens
170 Far-infrared optics
178c Automatic stage for far-infrared light imaging optics
180 Far-infrared light cylindrical lens
190 Far-infrared light imaging optics
191, 192, 194 Far-infrared light lenses
193 Elliptic mirror
195 Composite paraboloidal mirror (Winston cone)
200 Specimen
202 Automatic stage for specimen movement
205 TPG light removal slit
206 Automatic stage for moving TPG light removal slit
210 Diffuser plate
235 Detection pump light
250 Wavelength-variable far-infrared light
251 Far-infrared-light spot size
270 Concave cylindrical lens
271 Detection light imaging optics
275 ND filter
290 Photodetector
295 Far-infrared photodetector
296 Automatic stage for far-infrared photodetector
300 Detection light
400 Signal processing unit
500 Control unit

The invention claimed is:

1. A far-infrared spectroscopic device, comprising:
a wavelength-variable far-infrared light source generating far-infrared light;
an illumination optics that illuminates a specimen with narrowband far-infrared light contained in the far-infrared light output from the wavelength-variable far-infrared light source;
a filter that removes broadband far-infrared light generated concurrently with the narrowband far-infrared light; and
a photodetection system detecting light transmitted through the specimen.

2. The far-infrared spectroscopic device according to claim 1, wherein the photodetection system converts the narrowband far-infrared light transmitted through the specimen into near-infrared light and detects the near-infrared light.

3. The far-infrared spectroscopic device according to claim 2,
wherein the photodetection system includes:
a nonlinear optical crystal that converts the narrowband far-infrared light into the near-infrared light based on pump light output from the wavelength-variable far-infrared light source; and
a photodetector that detects the near-infrared light.

4. The far-infrared spectroscopic device according to claim 2, further comprising afar-infrared optics that condenses the narrowband far-infrared light transmitted through the specimen only in a predetermined direction with respect to a surface on which the far-infrared spectroscopic device is provided,
wherein the photodetection system converts the narrowband far-infrared light condensed only in the predetermined direction into the near-infrared light.

5. The far-infrared spectroscopic device according to claim 2, wherein the photodetection system further includes an optical element that expands the near-infrared light only in a predetermined one direction, and detects the near-infrared light expanded only in the predetermined one direction.

6. The far-infrared spectroscopic device according to claim 5, wherein the photodetection system further includes a near-infrared imaging optics that images the near-infrared light, the near-infrared light being expanded only in the predetermined one direction, along a direction orthogonal to the predetermined one direction.

7. The far-infrared spectroscopic device according to claim 1, further comprising:
   a filter stage that carries the filter and changes a spatial position of the filter;
   a specimen stage that carries the specimen and changes a spatial position of the specimen; and
   a control unit that controls movement of each of the filter stage and the specimen stage,
   wherein the control unit is configured to drive at least one of the filter stage and the specimen stage according to a change in output angle of the narrowband far-infrared light with a change in frequency of the narrowband far-infrared light, and thus change a spatial position of at least one of the filter and the specimen to allow only the narrowband far-infrared light to be transmitted by the filter.

8. The far-infrared spectroscopic device according to claim 1, wherein the photodetection system includes a far-infrared photodetector that detects the narrowband far-infrared light transmitted through the specimen.

9. The far-infrared spectroscopic device according to claim 8, wherein the photodetection system further includes a far-infrared light imaging optics that forms an image of the narrowband far-infrared light through the specimen onto the far-infrared photodetector.

10. The far-infrared spectroscopic device according to claim 9,
    wherein the photodetection system further includes:
    a stage for the far-infrared light imaging optics, the stage carrying the far-infrared light imaging optics and changing a spatial position of the far-infrared light imaging optics; and
    a stage for the far-infrared photodetector, the stage changing a spatial position of the far-infrared photodetector; and
    a control unit controlling movement of each of the stage for the far-infrared light imaging optics and the stage for the far-infrared photodetector,
    wherein the control unit is configured to drive at least one of the stage for the far-infrared light imaging optics and the stage for the far-infrared photodetector according to a change in output angle of the narrowband far-infrared light with a change in frequency of the narrowband far-infrared light, and thus change a spatial position of at least one of the far-infrared light imaging optics and the far-infrared photodetector to capture the narrowband far-infrared light in the far-infrared photodetector.

11. The far-infrared spectroscopic device according to claim 10, further comprising:
    a filter stage that carries the filter and changes a spatial position of the filter; and
    a specimen stage that carries the specimen and changes a spatial position of the specimen,
    wherein the control unit is configured to drive at least one of the filter stage, the specimen stage, the stage for the far-infrared light imaging optics, and the stage for the far-infrared photodetector according to a change in output angle of the narrowband far-infrared light with a change in frequency of the narrowband far-infrared light, and thus change a spatial position of at least one of the filter, the specimen, the far-infrared light imaging optics, and the far-infrared photodetector to allow only the narrowband far-infrared light to be transmitted by the filter and to capture the narrowband far-infrared light in the far-infrared photodetector.

12. The far-infrared spectroscopic device according to claim 9, further comprising:
    a light diffuser component allowing the narrowband far-infrared light transmitted through the specimen to be diffused; and
    a mechanism allowing the specimen or the light diffuser component to be moved or rotated.

13. A far-infrared spectroscopic method, comprising:
    generating far-infrared light using a wavelength-variable far-infrared light source;
    removing broadband far-infrared light contained in the far-infrared light using a filter;
    illuminating a specimen with only narrowband far-infrared light contained in the far-infrared light using an illumination optics; and
    detecting light transmitted through the specimen using a photodetection system.

14. The method according to claim 13, wherein the photodetection system converts the narrowband far-infrared light transmitted through the specimen into near-infrared light and detects the near-infrared light.

15. The method according to claim 13, wherein the photodetection system detects the narrowband far-infrared light transmitted through the specimen using a far-infrared photodetector.

* * * * *